United States Patent [19]

McLane

[11] 3,982,476
[45] Sept. 28, 1976

[54] COOKING APPARATUS
[76] Inventor: Jack S. McLane, Atlanta, Ga.
[22] Filed: Oct. 12, 1971
[21] Appl. No.: 187,972

[52] U.S. Cl. .................................. 99/339; 99/445; 126/25 A
[51] Int. Cl. ............................................ A47j 37/07
[58] Field of Search ............ 99/445, 444, 339, 340, 99/449, 450; 126/9, 25, 29

[56] References Cited
UNITED STATES PATENTS

| 124,296 | 3/1872 | Smith | 99/445 |
| 902,945 | 11/1908 | Day | 99/339 UX |
| 2,482,068 | 9/1949 | Larson | 126/9 X |
| 2,652,766 | 9/1953 | Cralle | 99/450 X |
| 2,780,215 | 2/1957 | Vacanti, Jr. | 126/9 |
| 2,884,849 | 5/1959 | Priem | 99/444 |
| 2,885,950 | 5/1959 | Stoll et al. | 99/340 |
| 2,943,557 | 7/1960 | Suchlsen | 99/446 X |

FOREIGN PATENTS OR APPLICATIONS

| 424,546 | 3/1911 | France | 99/445 |
| 1,139,489 | 2/1957 | France | 99/444 |

Primary Examiner—William I. Price
Assistant Examiner—Arthur O. Henderson
Attorney, Agent, or Firm—Jones, Thomas & Askew

[57] ABSTRACT

Cooking apparatus especially suited for outdoor cooking using charcoal, wood and the like for fuel. The container-like body supported on legs may be made from sheet metal and includes a special damper arrangement beneath a corrugated foraminous sheet metal meat support. Charcoal or other fuel is supported in a removable pan inside a large container smaller than the inside area defined by the body and mounted above a sheet metal damper wall in which there are two large damper openings through which air flow is adjusted by means of a manually positioned hinged damper plate. The larger container has ventilation holes around the edges. The corrugated formation of the foraminous plate provides slanted surfaces and grease troughs which help control the cooking and the grease disposal. A large, hinged hood may be swung and supported out of the way and the hood has a removable shelf. A special grease guard is part of the body. Special pivoted brackets selectively retain the hood in place.

4 Claims, 7 Drawing Figures

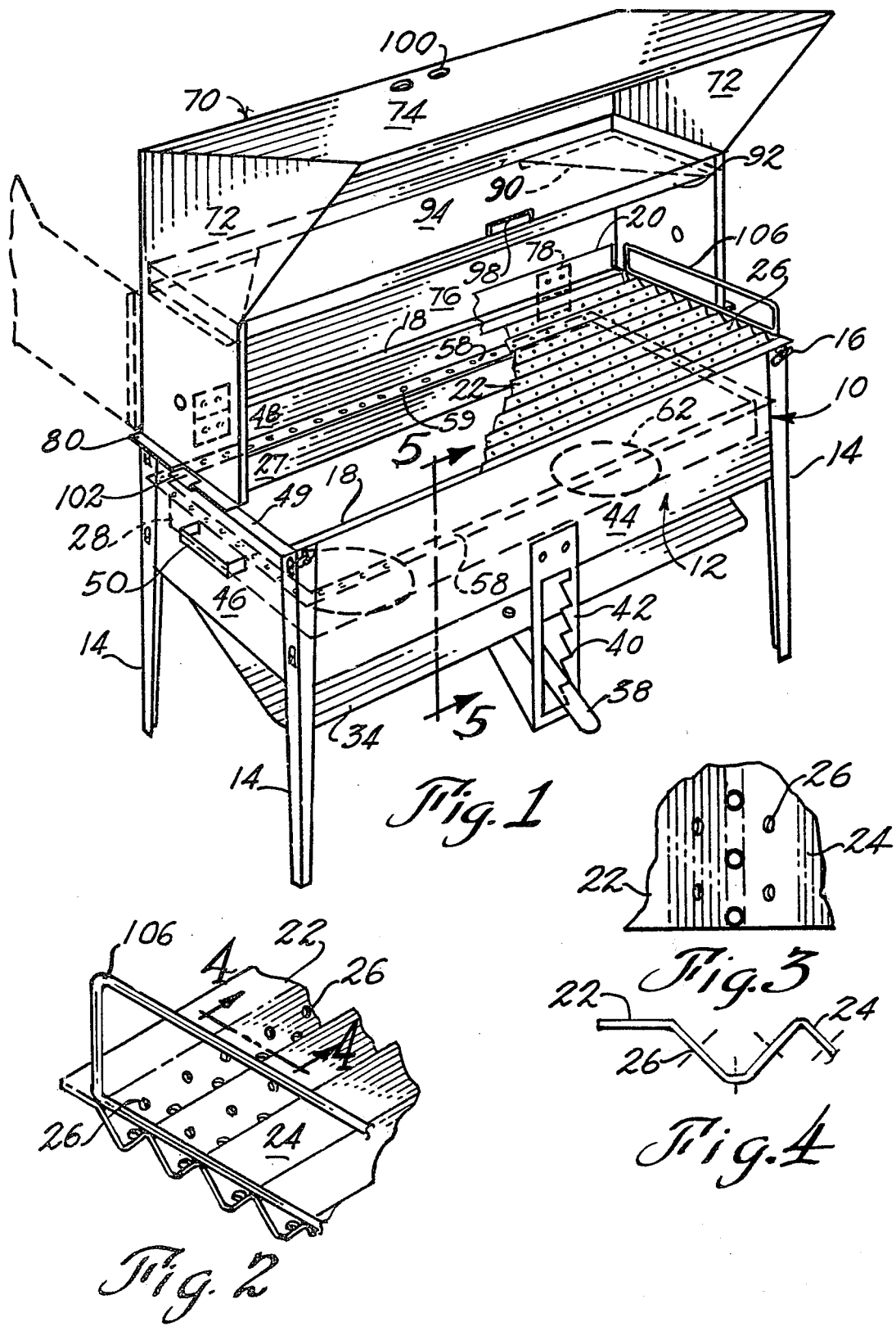

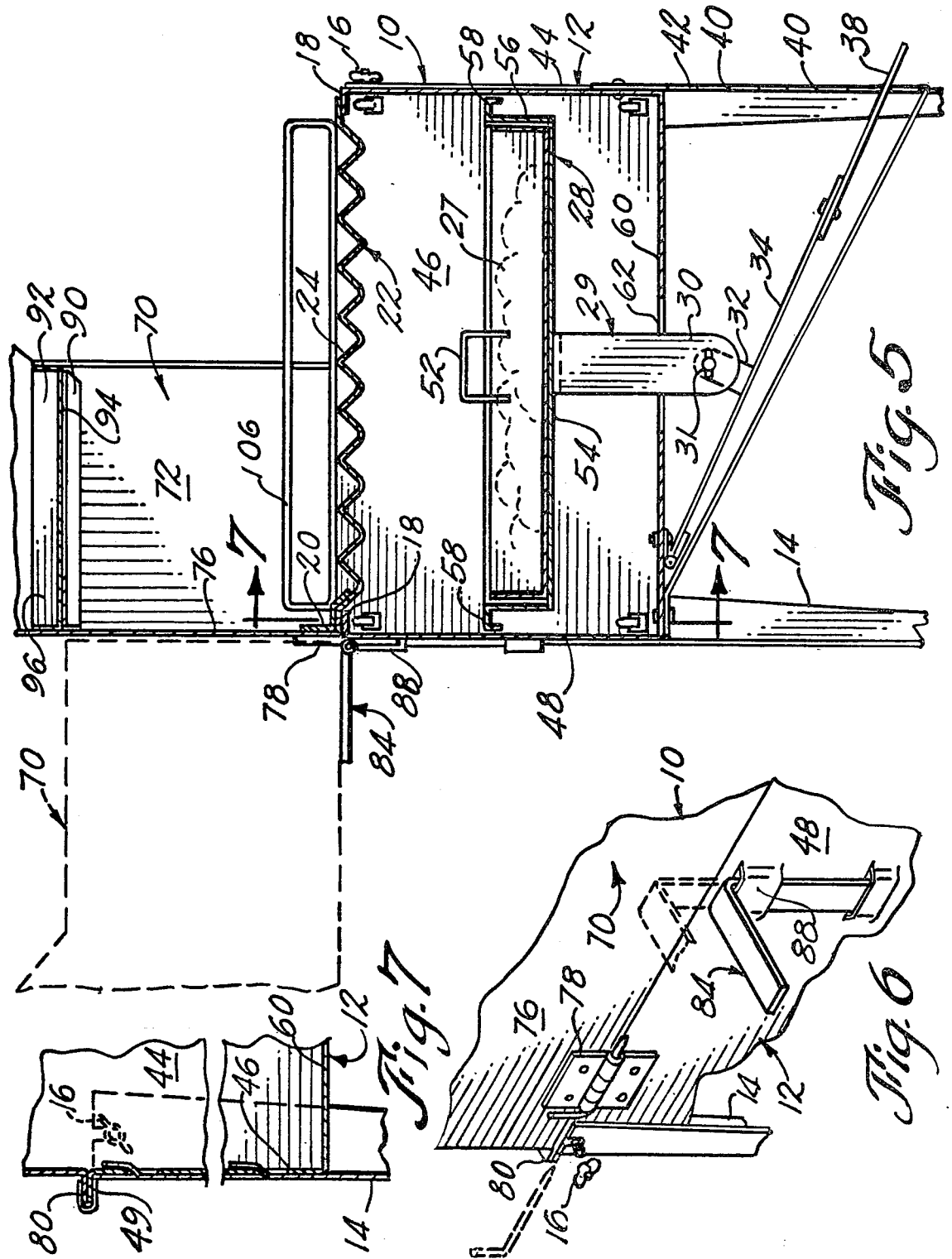

COOKING APPARATUS

BACKGROUND OF THE INVENTION

1. Field of the Invention

Cooking apparatus and particularly outdoor cooking apparatus. Damper controlled cooking apparatus.

2. Description of the Prior Art

Prior art includes the following U.S. Pats. No.: 2,608,190; 2,656,360; 2,746,377; 2,894,448; 2,923,229; 3,035,566; 3,191,591; 3,152,591; 3,389,651; 3,478,733. Devices for certain types of cooking have improper control of the grease disposal and the rate of cooking, that is, the proper regulation of heat on the food. It is well known that the rate of heat has a large effect on the flavor of certain cooked foods particularly fine cuts of steaks, chops and other meats, fowl and fish. Cooking too fast can spoil a good bit of the flavor. Known working devices cook the meat on some sort of flat surface some of which include openings and depressions but none with the grease control and cooking control obtained through the simplicity of the present device.

SUMMARY OF THE INVENTION

The problem of grease control and rate of heat is reduced through the use of the present device of the corrugated cooking platform on which the food is placed and which has slanted sides down which grease or fats run and there is also a very effective damper control beneath the cooking platform through the use of restricted openings and a bottom damper member. At the same time the entire organization of the cooking apparatus is improved and various details which aid in proper regulation of the heat. For example, the pan of fuel such as charcoal is raised or lowered by means of a manual control which also regulates the damper because the further away from the meat the more draft and the nearer to the meat the lesser amount of draft or even the damper could be closed completely, thereby providing a more inherent control without requiring so much immediate judgement on the part of the person doing the cooking.

An object of this invention is to provide a cooker for manual operation which regulates the grease and juice control from the food to the source of heat and also provides simultaneous regulation of the distance of the fuel from the food as well as the damper control when the distance is varied.

Another object of this invention resides in the particular construction of the cabinet and the damper control and other specific elements which make the device practical from a cost standpoint as well as effective from an operation standpoint.

BRIEF DESCRIPTION OF THE DRAWINGS

FIG. 1 is a perspective view of the present cooker with the hood in operative position.

FIG. 2 is a partial perspective view showing one corner of the foraminous, corrugated food platform.

FIG. 3 is a top plan view of a portion of the food platform shown in FIG. 2, without the handle.

FIG. 4 is a cross-sectional view taken substantially along lines 4—4 in FIG. 2.

FIG. 5 is a cross-sectional view taken substantially along lines 5—5 in FIG. 1.

FIG. 6 is a partial perspective view of the back of the cooking device showing the hood support, and removable hinge pin.

FIG. 7 is a cross-sectional view taken along lines 7—7 in FIG. 5.

DESCRIPTION OF THE PREFERRED EMBODIMENT

In FIG. 1 the entire cooking apparatus is designated generally by reference numeral 10 and comprises a sheet metal body designated generally by reference numeral 12 and in the form of a large rectangular container supported on tapered sheet metal legs 14 each attached in place by means of butterfly nuts 16 at the respective corners of the body 12. Formed around the upper edge of body 12 and extending inward therefrom is a peripheral flange 18. A grease drip guard 20 seals the back edge of flange 18 with the L shape shown in cross-section in FIG. 5.

Supported on an inwardly projecting ledge inside the body 12 is the food support or platform 22 which is readily seen in FIGS. 2,3,4 et al. and is in the form of a foraminous corrugated sheet metal plate having longitudinal sloping surfaces 24 with openings in random arrangement and there being so many as to make the platform 24 essentially foraminous or perforated and ventilated by holes 26. Mounted within the body 12 for removal therefrom is a rectangular open-top fuel (charcoal) pan 27 supported in a container 28 on a U-shape support 29 having arms 30 pivotally mounted on a pin 31 on a projecting member 32 mounted on a movable damper plate 34 having a control arm 38 attached thereto. Arm 38 is fitted into one of several notches 40 made in an open guide plate 42 riveted to the front 44 of the body 12.

Body 12 is a type of cabinet construction including the front 44, sides or ends 46 and a back 48. A peripheral marginal edge 49 extends from front 44, sides 46 and back 48. The ends 46 are provided with handles 50.

The charcoal pan 27 has handles 52 on the opposite ends thereof and is removably supported in the movable container 28 on the bottom 54 having sides 56 with projecting flanges 58 having air vent holes 59. Movement of the control arm 38 automatically moves the charcoal pan 27 by moving the support container 28 through the support 29 by arms 30 and at the same time moves the damper plate 34 towards or away from the bottom 60 of the body 12 which has spaced openings 62 therein. There is a support 29 thru each of the two openings 62 and therefore there are two supports 29 spaced across the length of the body 12.

The hinged upper hood is designated generally by reference numeral 70 and comprises ends 72, a top 74 and a back 76 which is hinged by hinges 78 to the back 48 of the body 12. The ends of the hood 70 have triangular formations near the upper part which makes the hood project over the corrugated food platform 22 in the upper area but not in the lower area in the manner shown in FIG. 1. Ends 72 have projecting flanges 80 thereon which rest against the flanged edge of the body 12 and support the hood in the operative condition shown in FIG. 1. The hood 70 may be swung to an inoperative, out of the way condition shown in the dotted lines of FIG. 5 whereat it rests upon a support member 84 shown in FIG. 6 which is a bent plate inserted in slotted portion 88 formed on the back 48. Hood 70 also includes on the inside thereof inwardly projecting triangular plates 90 which support a removable tray designated generally by 92 and having a bottom 94 and an upstanding peripheral marginal edge 96 on which is mounted handles 98. The top 74 of the hood 70 has vent holes 100 therein. Hood 70 is latched at a selected position by means of clips 102 bent from metal plate in a U-shape and with a pivoted tongue whereby the U-shape fits over the flanges 80 and edge 49 to latch the hood 70 in place.

The corrugated food support 22 has long wire handles 106 mounted thereon at opposite ends thereof to assist in removing and replacing same.

While I have shown and described a particular preferred embodiment of this invention this is by way of illustration only and does not constitute any sort of limitation since there are various alterations, changes, deviations, amendments, revisions, additions, subtractions, combinings, mergers, and other departures which may be made in the embodiment shown and described without departing from the scope of the invention as defined by proper interpretation of the appended claims.

I claim:
1. In a cooking device:
 a. a container body supported on ground engaging members at respective corners thereof and said container body having damper openings in the bottom thereof and controlled ventilation therethrough,
 b. a foraminous, corrugated food platform supported on said container body above said bottom
 c. a movable fuel support pan movably supported on said body beneath said food platform and above said openings in the body,
 d. support means for said fuel pan extending through said bottom of said container,
 e. a damper plate mounted beneath said container body and being movable with respect thereto, and means connecting said damper plate and said fuel support pan for simultaneous operation and including a manually operated control means which moves both said damper plate and said pan simultaneously.
 f. the periphery of said support means for said fuel pan having a plurality of openings therein through which the air passes.

2. The device in claim 1 wherein said body has a flange on one side and there is a hood for said body which has a flange on one side superposed on said body flange, and a U-shaped bracket movable to cover and latch said flanges.

3. The device in claim 2: there being a grease member attached along the back edge of said body, said grease member being somewhat L-shaped with the vertical part of the L attached vertically and the horizontal part extending over the edge of said food platform.

4. The device in claim 2 wherein said hood has a removable shelf between the open bottom thereof and the projecting top.

* * * * *

UNITED STATES PATENT OFFICE
CERTIFICATE OF CORRECTION

Patent No. 3,982,476                Dated  September 28, 1976

Inventor(s)  Jack S. McLane

It is certified that error appears in the above-identified patent and that said Letters Patent are hereby corrected as shown below:

The terminal portion of the patent after May 28, 1991 is disclaimed.

Signed and Sealed this

*Eighteenth* Day of *October 1977*

[SEAL]

*Attest:*

RUTH C. MASON  
*Attesting Officer*

LUTRELLE F. PARKER  
*Acting Commissioner of Patents and Trademar*